United States Patent Office 3,272,475
Patented Sept. 13, 1966

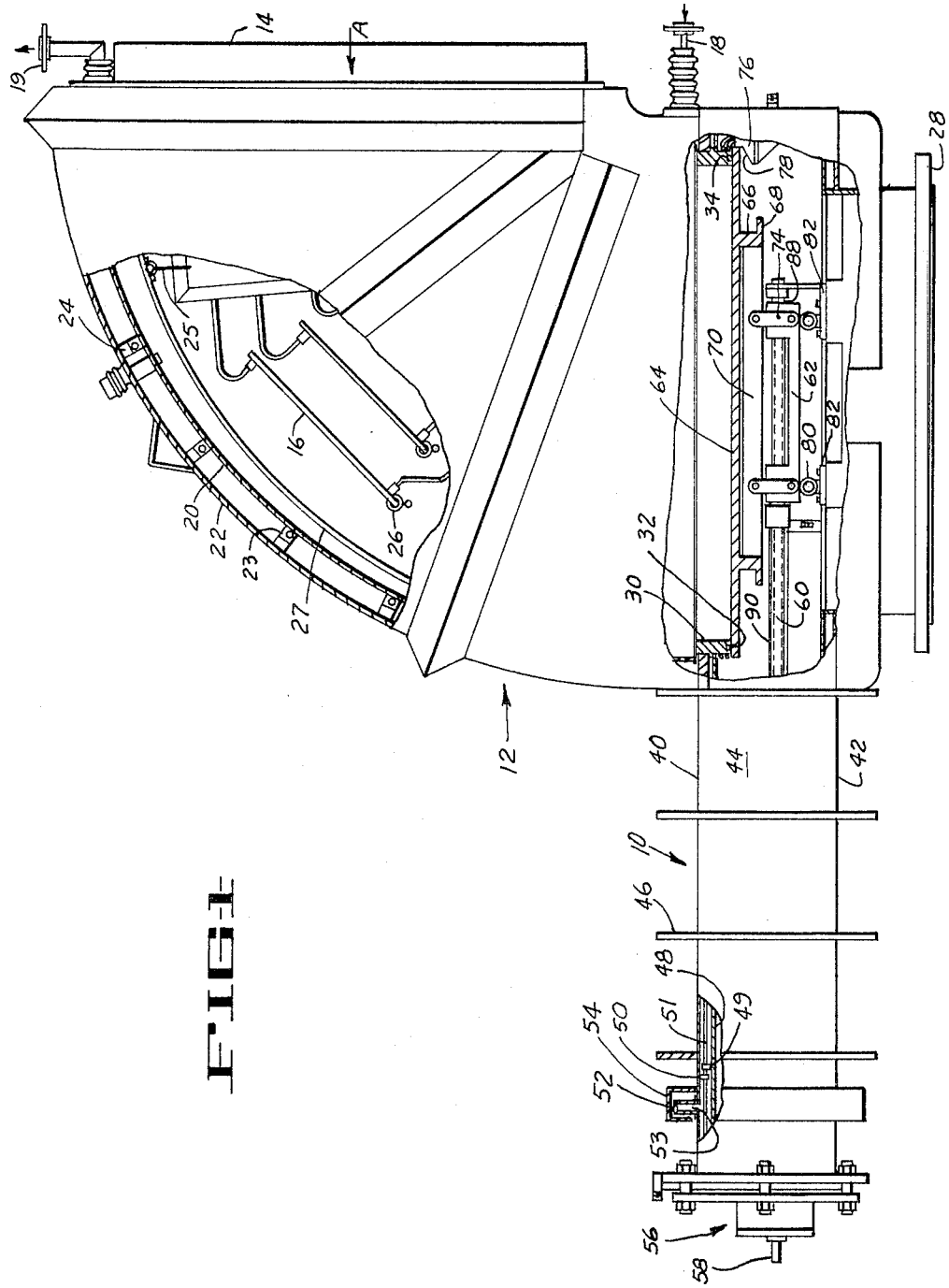

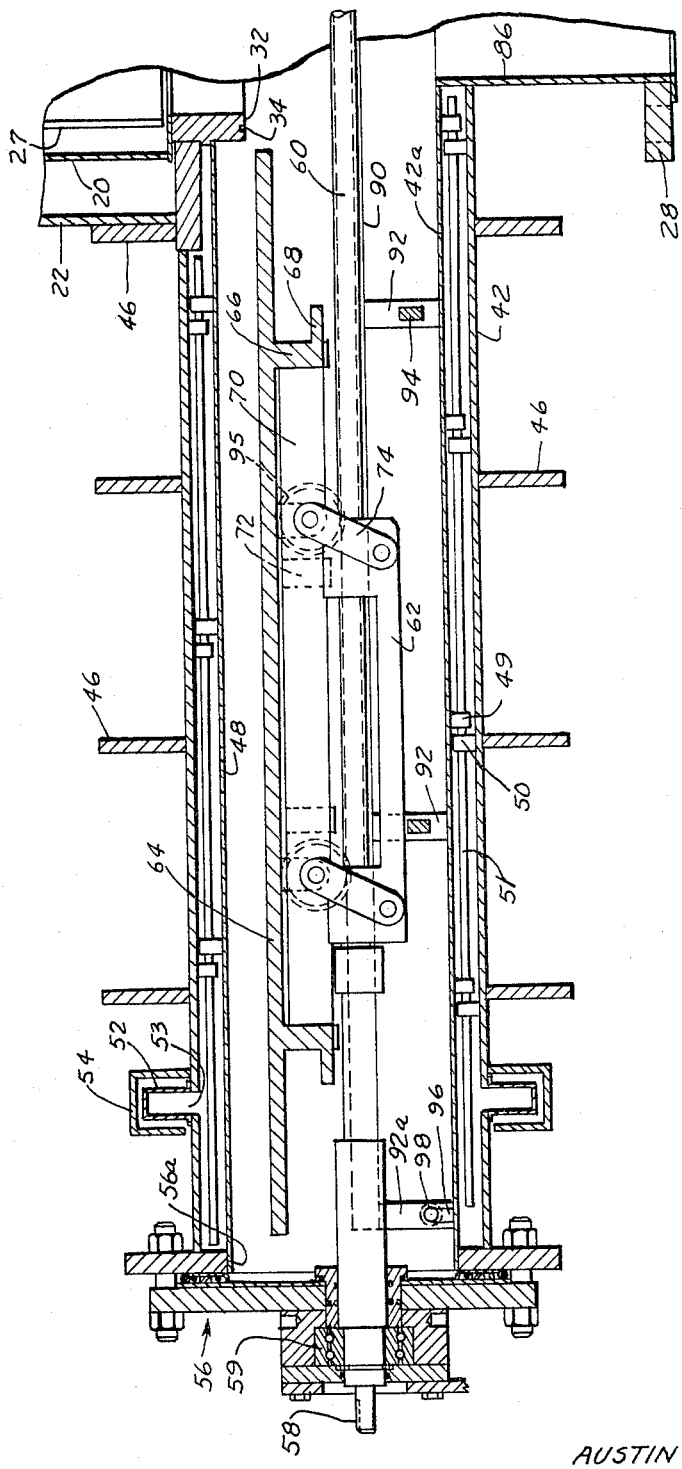

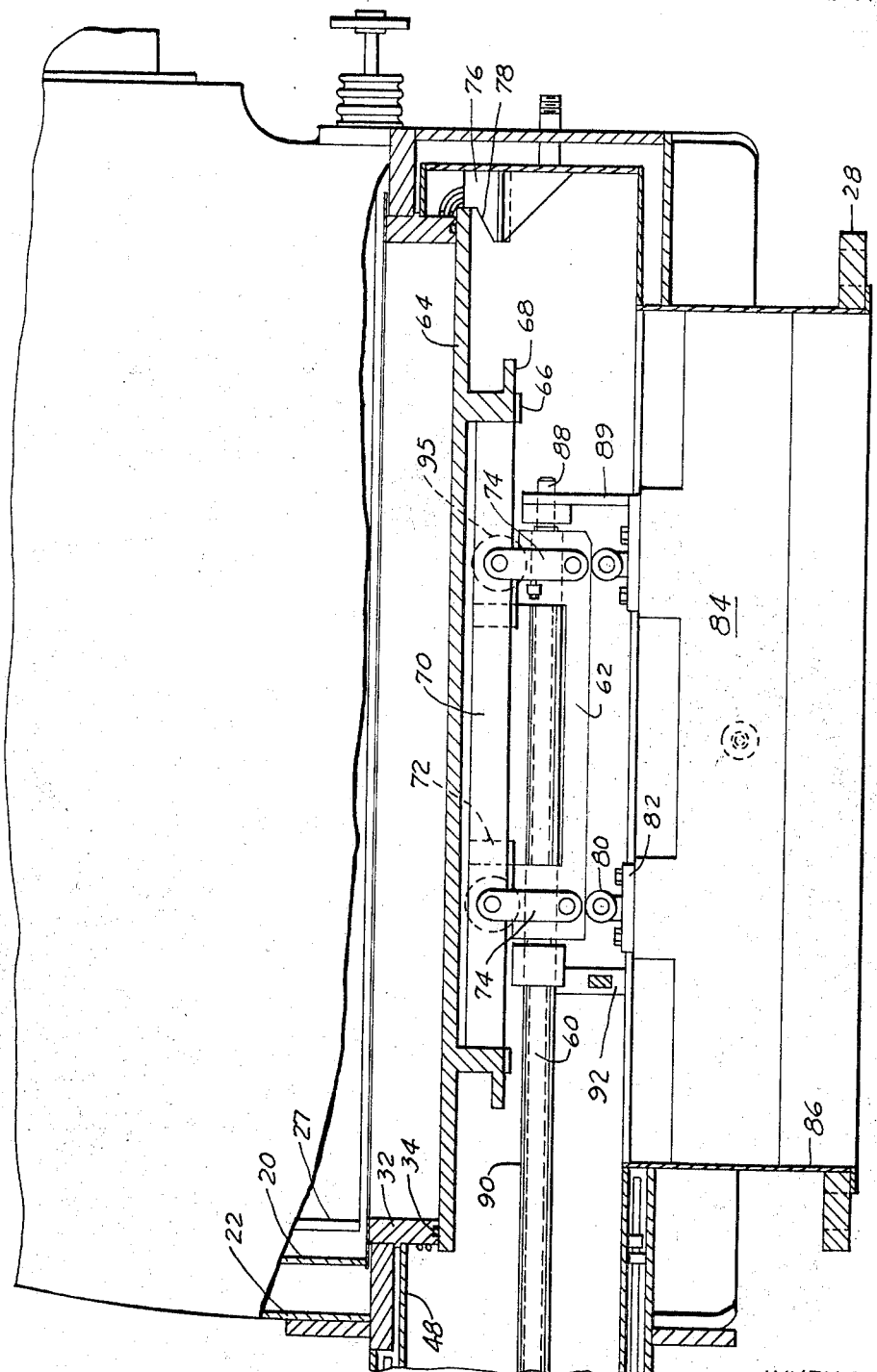
Sept. 13, 1966  A. U. BRYANT  3,272,475
FLEXIBLE GATE VALVE HAVING LOAD BEARING MEANS
Filed Feb. 8, 1963  5 Sheets-Sheet 3
INVENTOR
AUSTIN U. BRYANT
BY Edward B Gregg Sept. 13, 1966   A. U. BRYANT   3,272,475
FLEXIBLE GATE VALVE HAVING LOAD BEARING MEANS
Filed Feb. 8, 1963   5 Sheets-Sheet 4
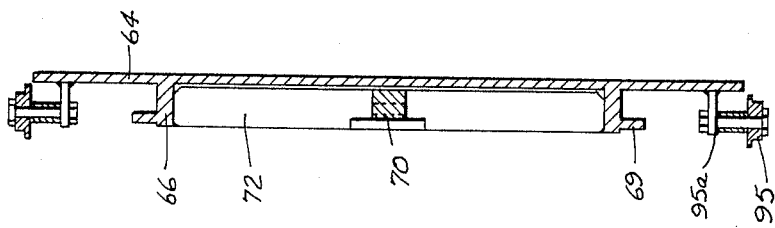
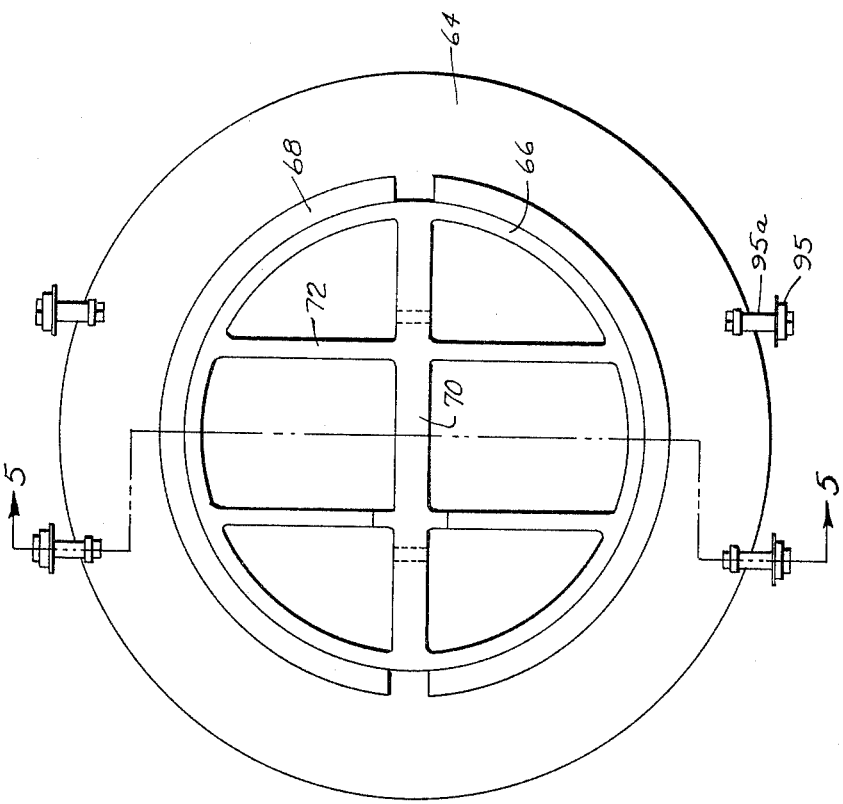
INVENTOR
AUSTIN U. BRYANT
BY Edward B Bugg

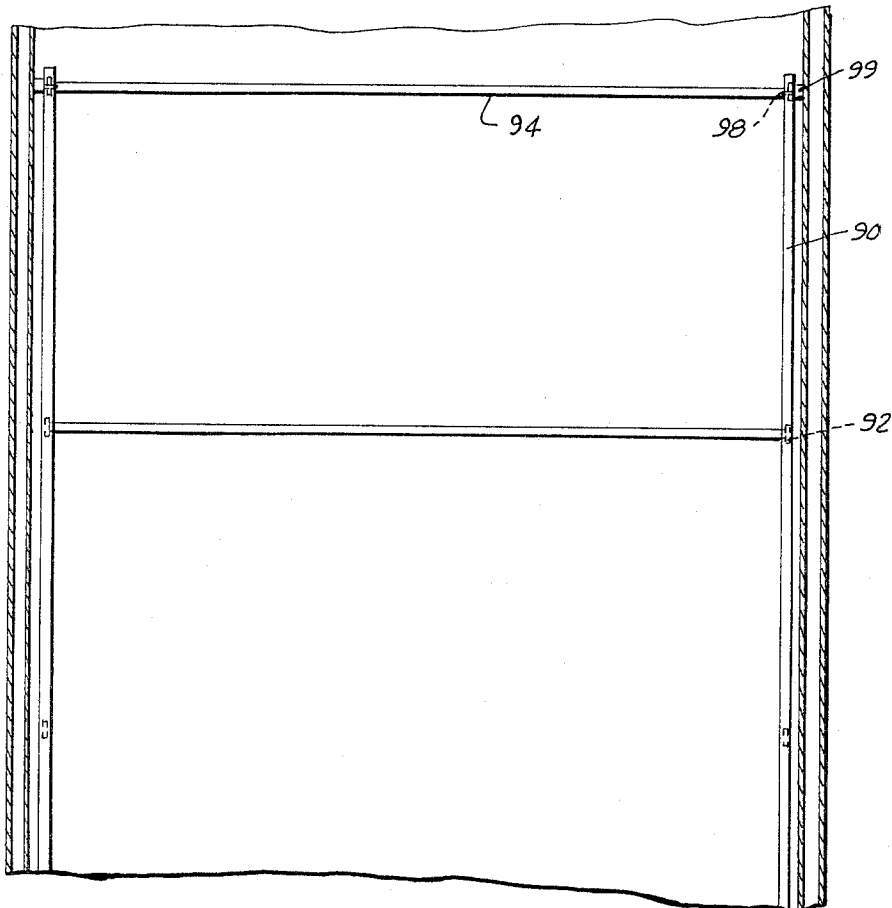
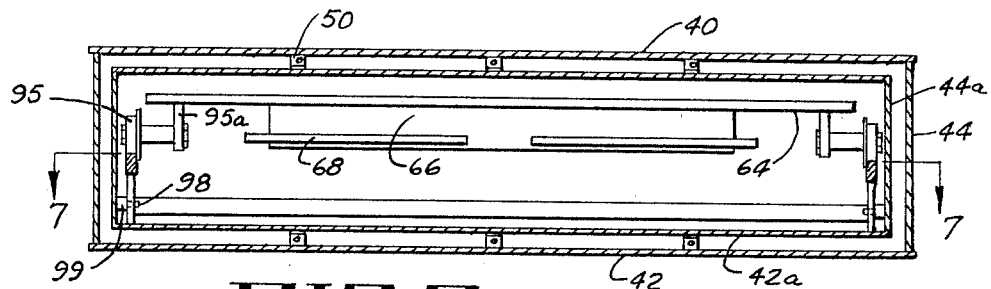

3,272,475
FLEXIBLE GATE VALVE HAVING LOAD BEARING MEANS
Austin U. Bryant, Walnut Creek, Calif., assignor to Grove Valve and Regulator Company, Oakland, Calif., a corporation of California
Filed Feb. 8, 1963, Ser. No. 257,141
5 Claims. (Cl. 251—203)

This invention relates to a gate valve and, more particularly, to a gate valve adapted to seat under mechanically induced pressure.

In certain types of gate valves, particularly where the sealing is against the flow of fluid, i.e., on the high pressure side, it is desirable to apply an extraneous force to seal the valve against the seat. However, in many cases slight irregularities around the seat or on the face of the valve itself may prevent complete sealing. In the case of a valve employed in an evacuation system, the gate may be required to seal off a conduit when a vacuum on either side is opposed by atmospheric pressure or by a vacuum of lower order.

It is, therefore, an object of this invention to provide a valve that may be moved into and out of alignment with the valve seat together with means for forcing the valve laterally against the seat.

It is a further object of this invention to provide a relatively flexible valve plate that may be forced tightly against the seat and flex into continuous sealing engagement therewith.

It is a further object of this invention to provide a flexible valve plate with means to force it against the seat by connection therewith to a load bearing member in the central portion of the valve plate.

It is a further object of this invention to provide a valve gate that is movable along a removable track to a position in alignment with the valve seat and then movable laterally into firm engagement therewith.

Other objects and advantages of this invention will become apparent from the description following when read in conjunction with the accompanying drawings wherein:

FIG. 1 is a view partly in section showing the valve of this invention installed in an evacuation system;

FIG. 2 is an enlarged partial section view showing the valve in open condition;

FIG. 3 is a partial section view showing the valve in closed condition;

FIG. 4 is a bottom view of the gate forming a feature of this invention;

FIG. 5 is a section view taken along line 5—5 of FIG. 4;

FIG. 6 is a vertical section view of the valve body showing the trackway and gate mounting; and FIG. 7 is a horizontal section view taken along line 7—7 of FIG. 6.

Referring more particularly to FIG. 1, the valve of this invention 10 is particularly adapted for use as a vacuum valve wherein a chamber (not shown) is connected to the duct 12 at weld end 14 and evacuated in the direction of the arrow A. The duct is preferably provided with a plurality of cold baffle plates or panels 16 through which liquid nitrogen or similar cryogenic fluid is circulated from inlet pipe 18 to outlet pipe 19 in order to assist the vacuum pump by freezing and retaining certain susceptible molecules, such as oil vapor that may be back-streaming from the pump, water vapor and the like. The duct 12 is preferably of multi-walled construction having an inner and outer shell 20 and 22 connected together by rods 23 inserted through enlarged holes in aligned eye blocks 24 on the inner and outer shells. The enlarged holes provide a sliding and free movement suspension arrangement that will accommodate relative expansion and contraction occasioned by differential temperature. Preferably the baffles 16 are supported at 25 and 26 within an inner cold shell or trap 27 through which the liquid nitrogen is also circulated.

The molecules drawn through the duct 12 by a suitable vacuum pump (not shown) which may be connected at flange 28 pass through a flow passageway 30 around which is surrounded by a valve seat 32 preferably including suitable seal means 34 such as a conventional O-ring.

The valve 10 is preferably horizontally disposed and includes top and bottom walls 40 and 42 and side walls 44 all of which may be reinforced by hoop-like reinforcing ribs 46 which are welded thereto in order to prevent internal buckling. The valve body 10 is preferably of double walled construction having an inner shell 48 which is secured to the outer shell by means of eye blocks 49 and 50 secured to the inner and outer walls respectively and slidably carried on an interconnecting rod 51. Again the rods 51 engage enlarged holes in the eye blocks that permit relative sliding and transverse movement that may be occasioned by differential thermal expansion or contraction. Additionally, the outer wall preferably includes an expansion joint 52 comprising a channel member of relatively thin metal that can be expanded and contracted laterally. The bendable channel 52 is welded across a gap 53 around the outer wall, so that the thin channel can bend to accommodate thermal expansion and contraction. The expansion joint 52 may be protected by a shield 54 which is of larger channel shape and secured to the outer wall of the valve body. At the end of the valve body is a conventional bonnet structure 56 sealing off the end and rotatably supporting a stem 58 or other suitable valve operating mechanism. Rotation of the stem in bearing 59 (FIG. 2) produces rotation of an elongated screw 60 integral therewith that threadedly receives an enlarged motion transmitting or traverse member 62 threadedly received on the screw to move therealong as the screw is rotated.

Connected to the traverse member 62 by means hereinafter to be described is the valve closure member which preferably comprises a relatively flexible circular plate 64 of a diameter slightly larger than the valve seat 32. Secured to the under side of the valve plate 64 is a circular load bearing member or beam 66 preferably strengthened by a radial flange 68. The circular load transmitting member 66 is reinforced by a diametrical beam 70 and cross ribs 72 all of which are welded directly to the circular load bearing member but as shown in FIG. 4 are spaced from the underside of the valve plate 64 (FIGS. 4 and 5) to permit some flexing of the central portion of the plate 64 under fluid pressures. Thus, axial loads on the beam 70 will be transmitted, not directly to the valve plate 64, but to the bearing ring 66 which will distribute them uniformly around the valve plate. Additionally, the bearing ring is of a diameter smaller than the valve seat 32 so that axial loads transmitted thereby will force the central portion of the valve plate 64 upward causing it to flex slightly around the outside until contact around the valve seat is complete.

Referring again to FIGS. 1 to 3, the means for transmitting such axial loads will now be described. Pivotally carried on the traverse member 62 is a pair of toggle links 74 that are in turn pivotally mounted on the diametrical load transmitting beam 70. Also provided on the end of the valve body 10 is a stop block 76 having an inclined front edge 78 that is engageable by the leading end of valve plate 64 as it moves from the open position shown in FIG. 2 to the closed position shown in FIG. 3. Then, when the valve plate 64 contacts the stop plate 76 further movement of the traverse member 62 along the thread 60 forces the lower ends of the toggle links 74 forwardly to swing the links 74 upwardly forcing the valve 64 firmly against the valve seat 32, the action being initially assisted by the inclined leading edge 78 of the stop plate 76. A pair of rollers 80 mounted on brackets 82 secured to a rail or beam 84 extending across the outlet passageway 86 engages the underside of the traverse member 62 to prevent it from being forced downwardly and function as a base against which the toggle links 74 push to bring the valve plate 64 firmly against the valve seat 32. Dimensions of the toggle links 74 and their mountings are selected so that the valve plate 64 is driven firmly against the seat causing it to flex downwardly somewhat around its periphery to adjust itself to any irregularities in the surface of the valve seat 32. Preferably an adjustable stop lug 88 in bracket 89 is disposed in the path of the traverse member 62 to stop further longitudinal movement thereof after the toggle links have been extended the desired amount.

As an additional feature of this invention a pair of side rails 90 are supported on the inner bottom wall 42a on legs 92, the rails at opposite sides of the valve body being interconnected by strengthening cross members 94 which space the rails to be traversed by flanged rollers 95 rotatably mounted in brackets 95a carried on the underside of the valve gate plate 64. Thus, the gate moves freely along the rails 90 and guided therealong by the flanged rollers from the open position of FIG. 2 to the closed position of FIG. 3.

The rails 90 are merely supported on the bottom wall 42a of the valve body and are not secured in place so that they may be moved readily to facilitate cleaning and repairs in the interior of the valve body. The rails are positioned by inserting them through the bonnet opening 56a and inserting a slot 96 in the rearward pair of legs 92a over a pin 98 extending from a pair of lugs 99 on each side of the valve body. Thus, the pins 98 hold the legs and, hence, the track 90 in proper longitudinal position and the engagement of the lugs 99 against the sides of the legs secure them against lateral displacement.

While this invention has been described in connection with a preferred embodiment thereof, it is understood that modifications and changes therein may be made by those skilled in the art without departing from the spirit and scope of this invention which is defined by the claims appended thereto.

Having described my invention I claim:
1. A valve comprising:
   a valve body,
   a flow passageway through said valve body,
   an annular valve seat surrounding said flow passageway,
   a generally circular, flexible valve plate,
   an annular load transmitting member of a diameter smaller than said valve seat and valve plate secured coaxially to said valve plate,
   a motion transmitting member,
   means connected to said motion transmitting member to produce movement thereof to carry said valve plate into and out of alignment with said valve seat, and
   means connecting said motion transmitting member and said load transmitting member and operated in response to movement of said motion transmitting member when said valve plate is moved into alignment with said valve seat to urge said load transmitting member toward said valve seat and force said valve plate into firm engagement with said valve seat.
2. The valve defined in claim 1 wherein said load transmitting member comprises:
   a ring secured to said valve plate so as to be substantially coaxial with said valve seat when said valve plate is in alignment therewith, and
   at least one cross bar secured across said ring but free of said valve plate, and wherein:
   the last-named means includes means connected between said motion transmitting member and said cross bar.
3. The valve defined by claim 2 wherein said least-named means comprises:
   at least one toggle link connected between said motion transmitting member and said cross bar, and
   a stop member engaged by one of said valve plate and load transmitting member when said valve plate is in alignment with said valve seat.
4. The valve defined by claim 3 including:
   at least one roller rotatably mounted in said valve body and displaced axially from said valve seat,
   said roller being engaged by said motion transmitting member while moving said valve plate into alignment with said seat to prevent movement of said motion transmitting member away from said seat but enabling it to move parallel to said valve seat.
5. A gate valve comprising:
   a valve body,
   a flow passageway through said body,
   an annular valve seat surrounding said flow passageway,
   a flexible, generally circular valve plate,
   a load transmitting member including a circular member of smaller diameter than said valve plate and valve seat secured coaxially to said valve plate,
   a track removably secured within said valve body and disposed generally parallel to said valve seat,
   guide means on said valve plate movable along said track,
   a traverse block for moving said valve plate lineally along said track from a first position displaced from said seat to a second position in alignment therewith,
   a toggle link connected between said traverse block and said load transmitting member, and
   a stop member engageable by said valve plate when in said second position to prevent further longitudinal movement thereof.

References Cited by the Examiner

UNITED STATES PATENTS

| | | | |
|---|---|---|---|
| 633,626 | 9/1899 | Stone | 251—203 |
| 1,643,063 | 9/1927 | Duffy | 251—203 |
| 2,850,260 | 9/1958 | Perazone | 251—203 X |
| 3,054,593 | 9/1962 | Baxter | 251—203 |
| 3,061,266 | 10/1962 | Hoffknecht | 251—204 X |
| 3,072,378 | 1/1963 | Holderer | 251—204 X |

FOREIGN PATENTS

| | | |
|---|---|---|
| 6,301 | 2/1900 | Great Britain. |
| 15,698 | 1/1927 | Netherlands. |

WILLIAM F. O'DEA, *Primary Examiner.*

CLARENCE R. GORDON, *Examiner.*